Dec. 4, 1956     C. H. KRENGEL     2,772,826
TIRE AND WHEEL MOUNT FOR TRUCKS
Filed Feb. 12, 1954
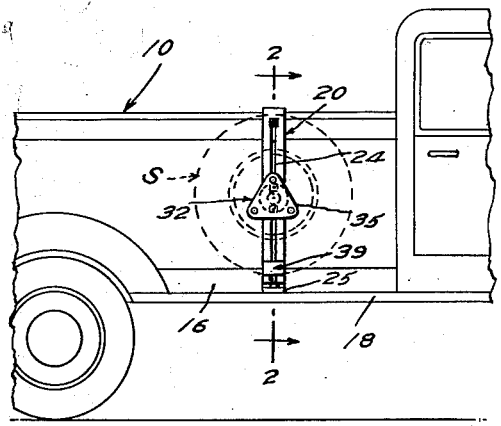
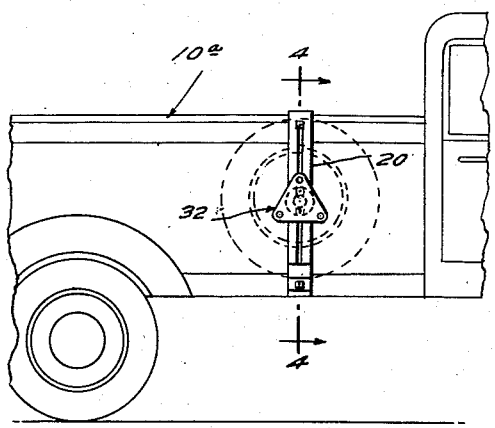
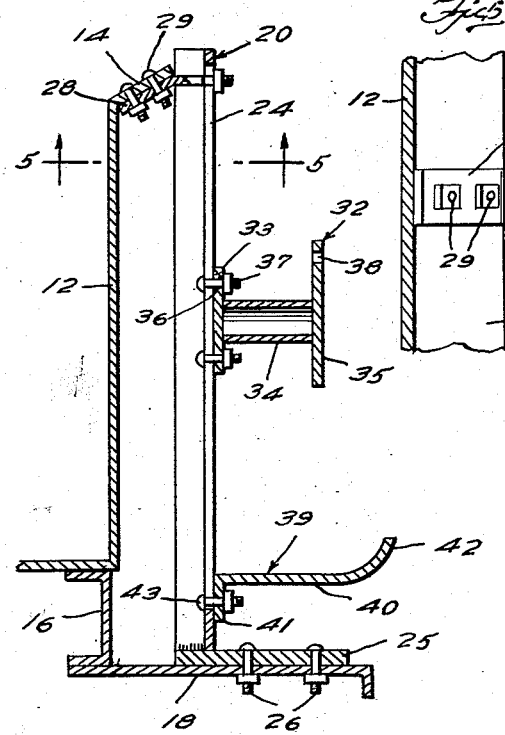
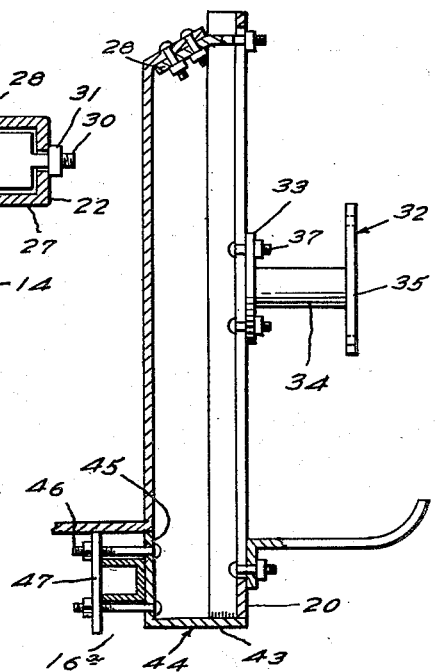
Inventor
Charles H. Krengel
By Herbert J. Jacobi
ATTY.

United States Patent Office

2,772,826
Patented Dec. 4, 1956

2,772,826

TIRE AND WHEEL MOUNT FOR TRUCKS

Charles H. Krengel, Twin Falls, Idaho

Application February 12, 1954, Serial No. 409,914

1 Claim. (Cl. 224—42.24)

This invention relates generally to motor vehicle accessories and is directed particularly to improvements in spare tire and wheel mounts.

The present invention has for a particular object to provide an improved spare tire and wheel mount by means of which such tire and wheel can be supported upon the side of a pick-up truck instead of beneath the bottom at the rear thereof as is customary so that the tire is not in a position where it will be covered with dirt and mud and it is easily accessible when a change is to be made.

Another object of the invention is to provide a tire mount of the character stated which might be identified as a universal type mount in that it is easily and quickly set up upon any make of pick-up truck and is readily adjustable to any size tire.

Another object of the invention is to provide a novel tire mount which is easily adjustable to tires of different sizes and which can be easily and quickly secured to the side of the body of a pick-up truck where such truck does not have the usual running board.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in side elevation of a portion of a pick-up truck having a running board and showing the universal type tire mount of the present invention applied or secured thereto.

Figure 2 is a vertical sectional view taken substantially on the line 2—2 of Figure 1.

Figure 3 is a view in side elevation of a portion of a pick-up truck of the type which does not have a running board showing a modified embodiment of the invention secured to the side of the body.

Figure 4 is a vertical section taken substantially on the line 4—4 of Figure 3.

Figure 5 is a transverse section taken substantially on the line 5—5 of Figure 2, the structure shown in detail by this section being also a part of the modified structure of Figures 3 and 4.

Referring now more particularly to the drawing and reference first being had to Figures 1 and 2, there is shown in Figure 1 a portion of a pick-up truck structure which is generally designated 10 and wherein the side wall 12 of the body has an upwardly and outwardly flaring top edge portion 14.

The numeral 16 designates, in Figure 2, a portion of the chassis frame to which the body is secured and the numeral 18 designates the running board.

In accordance with present invention there is provided a standard 20 which preferably comprises a section of three inch channel iron which may be from 36 to 40 inches high although it is to be understood that the setting forth of these dimensions is not limiting in any respect.

The center portion or web 22 of the channel iron 20 is provided with the slot 24 which extends through the major portion of the length of the standard.

The numeral 25 designates a base or foot plate to one end which a standard 20 is secured by welding or the like and this foot plate 25 is placed upon the top of the running board 18 where it is secured by bolts 26.

The channel iron standard 20 is secured to the foot plate 25 so that the flanges 27 of the channel iron are directed inwardly toward the side wall 12 of the truck body and positioned at the upper end of the standard against the edge of the body flare 14.

The numeral 28 designates an angle plate or securing bracket which is positioned against the underside of the body flare 14 where it is secured by bolts 29 as illustrated and this plate is of a width to extend into the channel of the standard 20 in a horizontal position as shown.

The outwardly extending angled portion of the plate 28 carries a threaded stud 30 which passes through the slot 24 of the standard and receives the nut 31 which bears against the outer side of the web 22 and thus firmly secures the upper end of the standard in position.

Positioned against the outer side of the standard 20 is the mounting bracket which is generally designated 32. This bracket comprises an inner plate 33, which may be circular or any other form, the tubular stem 34 which is secured to the center of the plate 33 to extend outwardly therefrom and the outer plate 35, which may be triangular as illustrated.

The inner plate 33 is provided with suitable vertically spaced bolt openings 36 which align with the slot 24 to receive the securing bolts 37 which pass through the slot 24 and thus adjustably secure the bracket to the standard.

The outer plate 35 has bolt openings 38 to receive securing bolts, not shown, by which the central portion of the vehicle spare wheel may be firmly secured to the outer plate in the conventional manner.

In Figure 1 the position of the tire and spare wheel is illustrated with respect to the mounting structure and is generally designated by the reference character S.

It will be readily seen that the supporting bracket 32 can be adjusted vertically on the standard 20 in accordance with the diameter of the wheel and tire to be mounted thereon and also adjustably secured to the standard 20, below the bracket 32, is the tire rest arm which is generally designated 39 and which comprises an elongated body or plate 40 having its inner end downturned as indicated at 41 while the outer end curves upwardly as indicated at 42. The downturned inner end 41 positions against the face of the standard 20 and has a suitable aperture to receive a securing bolt 43 by which the rest is held in vertically adjusted position.

The plate 40 is of sufficient length to have the upwardly curving outer portion 42 extend beyond the vertical plane of the outer plate 35 so that when the wheel is secured to the plate 35 the tire will rest on the plate 40 in the concave portion of the upwardly curving end 42 as will be readily apparent.

In the embodiment of the invention illustrated in Figure 4 a slightly different means is provided for securing the standard in position where there is no running board on the side of the pick-up truck.

In Figure 3 the pick-up truck is generally designated 10a and in this construction where no running board is provided the lower end of the standard which is designated 20a and which is of the same design as the standard 20 is welded to the horizontal portion 43 of an angle bracket which is generally designated 44 and which has a vertical flange portion 45 which is positioned directly against the outer face of the truck frame 16a as illustrated. In other words the bracket 44 is positioned upon the inner side of the standard 20a so that the vertical part 45 can position against the frame as shown. This vertical portion 45 of the mounting bracket 44 is provided with suitable bolt openings and the frame is also suitably drilled to receive securing bolts 46 which are extended horizontally inwardly through the part 45 and through the frame and upon the inner side of the frame 16a the bolts pass through apertures in a clamp plate 47 which is secured by the bolts and nuts thereon to the inner side of the frame.

It will be seen from the foregoing that in this modified construction the only difference is in the manner in which the lower end of the standard 20a is secured to the truck body. The other features are the same as in the form illustrated in detail in Figures 2 and 5 and accordingly it is not believed that further detailed description of the modified construction is required.

From the foregoing it will be seen that the present invention provides a novel type of tire mount which can be easily secured to the side wall of the body of a pickup truck and which is readily adjustable to support a tire of any size. The invention also provides a means for supporting a spare tire and wheel in a position where it is easily accessible and where such a tire and wheel unit are not likely to be damaged because of mud and dirt thrown thereon as would be the case if mounted below the truck body at the rear in the customary manner.

I claim:

In a tire and wheel mount for a vehicle of the character described, the combination with a body structure supported on a chassis, said body structure having a sidewall terminating at the upper edge in an outwardly and upwardly extending flange, of a standard disposed vertically and in outwardly spaced relation to said sidewall, a longitudinally extending slot in said standard, a bracket fixed to said flange, screw threaded means on said bracket extending through said slot adjacent the upper end to secure the upper end of said standard to said sidewall, means adjacent the lower end of said standard for securing the same to said chassis, a wheel bracket, fastening means on said last named bracket extending through said slot for securing said last named bracket on said standard in vertically adjusted position, means on said last named bracket to removably secure a wheel thereto, a tire rest and fastening means on said tire rest extending through said slot for securing said tire rest in vertically adjusted position on said standard.

References Cited in the file of this patent
UNITED STATES PATENTS

| | | |
|---|---|---|
| 894,079 | Suthergreen | July 21, 1908 |
| 1,297,942 | Wahrenberger | Mar. 18, 1919 |
| 1,502,583 | Pepin | July 22, 1924 |
| 2,621,837 | Etbauer | Dec. 16, 1952 |
| 2,701,670 | Hutchinson | Feb. 8, 1955 |